_United States Patent_ [19]

Kawashima et al.

[11] Patent Number: 5,111,585
[45] Date of Patent: May 12, 1992

[54] METHOD AND APPARATUS FOR MEASURING AND ADJUSTING THE WHEEL ALIGNMENT OF AUTOMOTIVE VEHICLES

[75] Inventors: Tsunenori Kawashima, Chiba; Morihiro Shimada, Tokyo; Hiroshi Fujii, Hiroshima, all of Japan

[73] Assignees: Iyasaka Seiki Co., Ltd., Tokyo; Mazda Motor Corporaton, Hiroshima, both of Japan

[21] Appl. No.: 616,777

[22] Filed: Nov. 20, 1990

[30] Foreign Application Priority Data

Nov. 21, 1989 [JP] Japan .................. 1-302500
Nov. 21, 1990 [JP] Japan .................. 2-316651

[51] Int. Cl.⁵ .................. G01B 5/255; G01B 7/315
[52] U.S. Cl. .................. 33/203.12; 33/288
[58] Field of Search ........... 33/203.12, 203, 203.13, 33/203.15, 203.16, 288

[56] References Cited

U.S. PATENT DOCUMENTS

| | | |
|---|---|---|
| 3,832,786 | 9/1974 | MacPherson et al. .............. 33/288 |
| 3,897,636 | 8/1975 | LeBlanc ........................... 33/203.13 |
| 3,908,280 | 9/1975 | Murakami et al. .................. 33/203.13 |
| 4,443,951 | 4/1984 | Elsässer et al. .................... 33/203.13 |
| 4,631,832 | 12/1986 | Schrammen et al. ............ 33/203.12 |
| 4,679,327 | 7/1987 | Fouchey et al. .................... 33/203.13 |
| 4,745,469 | 5/1988 | Waldecker et al. ................. 33/288 |
| 4,863,266 | 9/1989 | Masuko et al. ................... 33/203.15 |
| 4,885,846 | 12/1989 | Németh et al. .................... 33/203.13 |
| 4,901,442 | 2/1990 | Fujii .................................. 33/203.13 |

Primary Examiner—William A. Cuchlinski, Jr.
Assistant Examiner—C. W. Fulton
Attorney, Agent, or Firm—Bucknam and Archer

[57] ABSTRACT

A method of measuring and adjusting the wheel alignment of an automotive vehicle comprises bringing all of the four tires in condition for actual on-road running performance, restricting axial movement of both of the front tires alone, measuring the toe-in angles of the front and rear tires and adjusting the toe-in angle of each of the rear tires to the specification whereby the center line of an alignment adjusting apparatus is brought into alignment or parallel relation to the center line or axis of the vehicle. An apparatus is also disclosed for reducing this method to practice.

4 Claims, 6 Drawing Sheets

METHOD AND APPARATUS FOR MEASURING AND ADJUSTING THE WHEEL ALIGNMENT OF AUTOMOTIVE VEHICLES

BACKGROUND OF THE INVENTION

1. Field of the Invention

This invention relates to a method of and an apparatus for measuring and adjusting the wheel alignment of automotive vehicles.

2. Prior Art

Wheel alignment of four-wheeled automotive vehicles such as passenger cars, buses and trucks is effected conventionally with all of the four wheels mounted on respective rotary drums in a wheel alignment testing apparatus and rotated at a predetermined rate of speed, whereupon the toe-in or camber of each wheel is checked and adjusted to the manufacturer's specifications. In such instance, it is essential to see to it that the wheels are mounted on the respective drums with the center line of the vehicle axle registered with the longitudinal center line of the testing apparatus. Failing this would result in misaligned wheels and hence defective drive performance.

A prior art approach has been proposed in which a pair of oppositely disposed limiter arms are used to restrict lateral shift or displacement of each of the front and rear wheels in a direction transverse to the center line of the testing apparatus after the vehicle is mounted and brought into center-to-center registry with the apparatus. This approach however has a drawback firstly in that it is cumbersome and time-consuming to guide the vehicle as by an equalizer into proper registration with the testing apparatus and secondly in that because of coercive positioning the wheels against inherent axial movement with respect to the rotary drums, undue stress is imposed on the wheels which would hinder accurate measurement of wheel alignment approximating actual on-road performance.

SUMMARY OF THE INVENTION

With the foregoing drawbacks of the prior art in view, the object of the present invention is to provide a method and an apparatus for measuring and adjusting the wheel alignment of an automotive vehicle which will enable efficient and accurate alignment of the vehicle wheels in strict conformance with the manufacturer's specification settings.

More specifically, the invention provides such method and apparatus which will eliminate the need for mounting the vehicle in exact centering registry with an alignment testing apparatus prior to wheel alignment adjustment.

The invention further provides such method and apparatus which are capable of measuring and adjusting the vehicle wheel alignment with high precision under conditions closely approximating actual on-road running performance.

The above and other objects and features of the invention will be better understood from the following detailed description taken with reference to the accompanying drawings which illustrates by way of example a preferred embodiment which the invention may assume in practice. According to the invention, there is provided a method of measuring and adjusting the wheel alignment of a four-wheeled automotive vehicle which comprises the steps of: (a) rotating the front and rear tires of the vehicle on respective roller units which are held for free horizontal movement longitudinally of the vehicle; (b) bringing the outer side walls of both the front tires into pressure contact with a first sensor unit and restricting axial movement of the front tires; (c) measuring the pressure developed on contact of the front tires with the first sensor unit; (d) measuring the toe-in angle of each of the front and rear tires; (e) adjusting the toe-in angle of each of the rear tires to the specification until the pressure measured in step (c) becomes zero; and (f) adjusting the toe-in angle of each of the front tires.

An apparatus for carrying the above method into practice according to the invention comprises: a roller unit disposed for free horizontal movement longitudinally of the vehicle and including rollers engageable with the tread of each of the front and rear tires, a means of driving the rollers to rotate with each of the front and rear tires, a first sensor unit having means of restricting axial movement of the front tires and means of measuring the pressure developed on contact of the restricting means with the front tires, the restricting means being connected at one end to a pivotal link, and a second sensor unit movable horizontally toward and away from the center line of the apparatus and having a detecting means of detecting a toe-in angle of each of the front and rear tires, the detecting means including an optical displacement sensor, a tiltable disc member disposed in confronting relation to the displacement sensor and a plurality of rollers supported on the tiltable disc member and engageable with the side wall of each of the front and rear tires.

DETAILED DESCRIPTION OF THE PREFERRED EMBODIMENT

Figure 1:
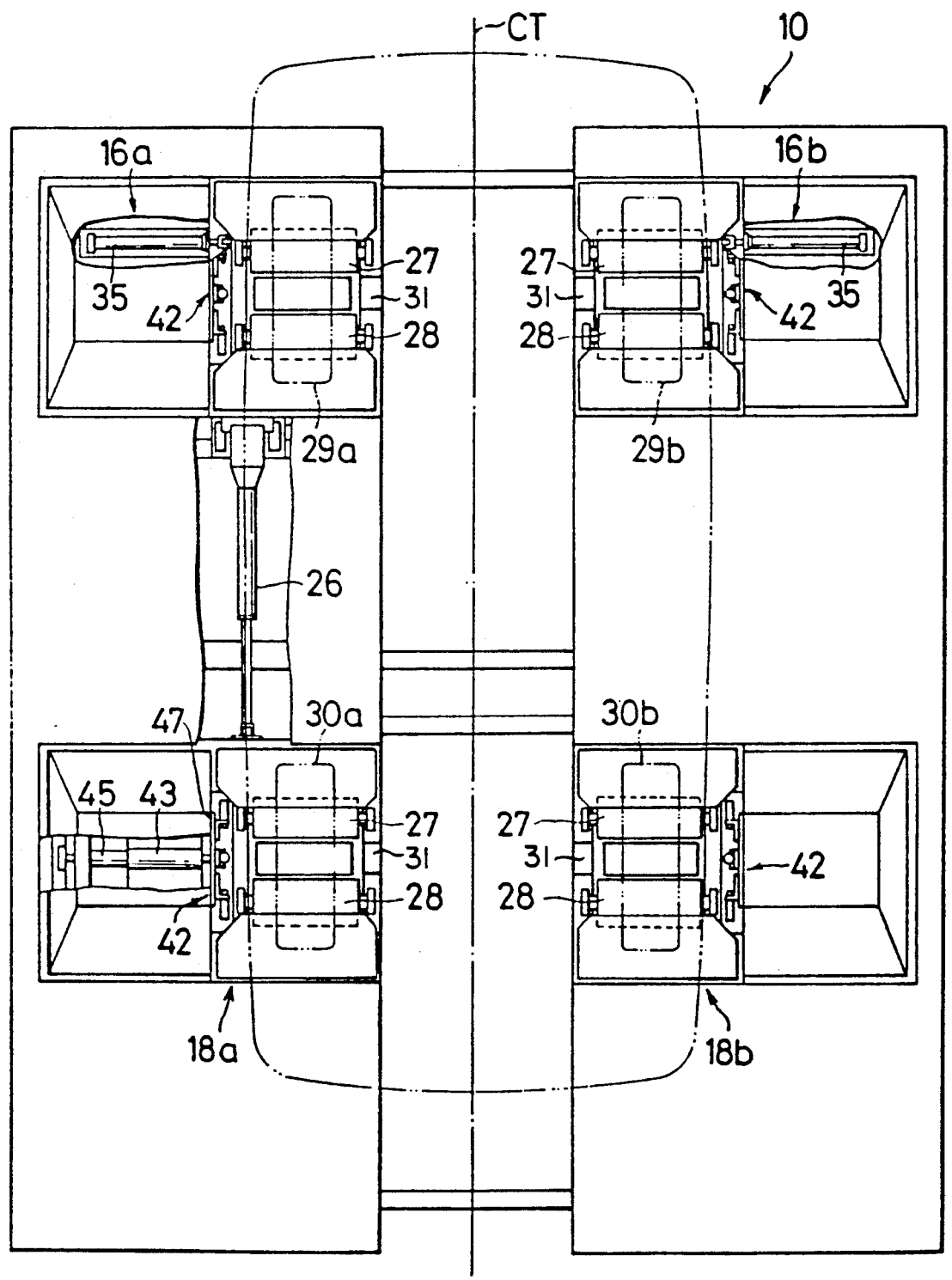
FIG. 1 is a plan view of a wheel alignment testing apparatus embodying the invention with a vehicle mounted thereon as indicated in phantom lines.
Figure 2:
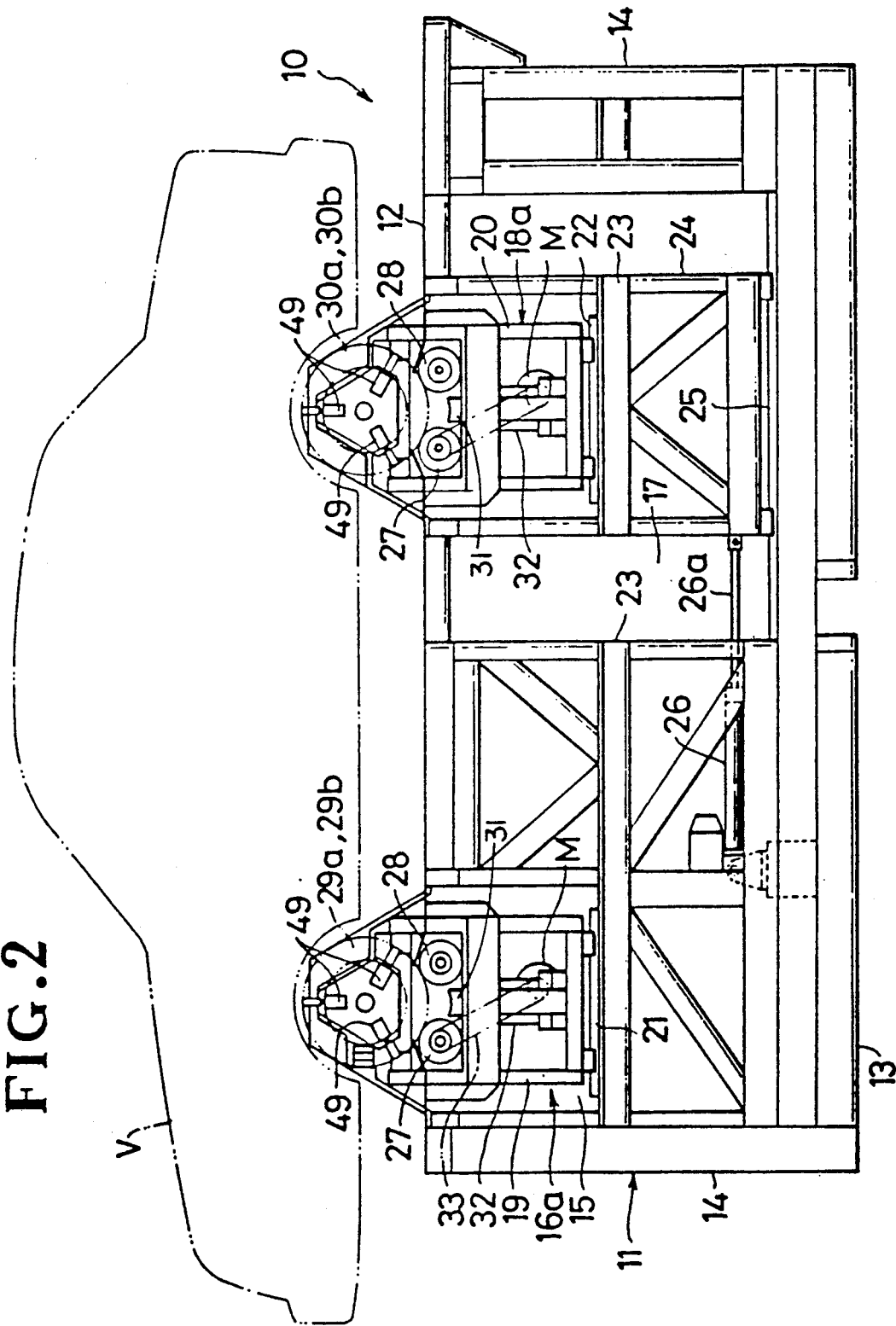
FIG. 2 is a side elevational view of the same.

Referring now to the drawings and FIGS. 1 and 2 in particular, there is shown a wheel alignment testing apparatus 10 which comprises a machine frame 11 including an upper horizontal support frame member 12 and a lower horizontal support frame member 13 interconnected by vertical side support frame members 14, 14. The upper frame member 12 is cut out at one or front end to provide a first compartment 15 for accommodating a first or front pair of roller units 16a, 16b and at the opposite or rear end to provide a second compartment 17 for accommodating a second or rear pair of roller units 18a, 18b, the second compartment 17 being larger in spatial size than the first compartment 15 for purposes later described.

The first pair of roller units 16a, 16b, and the rear pair of roller units 18a, 18b are mounted on respective front and rear movable racks 19 and 20 which are movable horizontally slidably on and along respective guide rails 21 and 22 secured to a longitudinally extending intermediate frame member 23. Thus, each of the roller units 16, 18 is movable to and fro in parallel to a longitudinal center line CT of the testing apparatus 10 or a center line CV of a vehicle axle not shown.

In the presently illustrated embodiment of the invention, either one of the front roller units 16a, 16b is held stationary horizontally while the other front roller unit is disposed for free horizontal sliding movement as above described, although all of the front roller units 16a, 16b and the rear roller units 18a, 18b may be supported for free sliding movement for the purpose of the invention.

The rear rack 20 is connected to a third movable rack 24 which is movable horizontally slidably on and along a guide rail 25 secured to the lower frame member 13.

A first fluid-operated cylinder 26 is mounted on the lower frame member 13 with its piston rod 26a disposed in abutting engagement with the third rack 24. Actuation of the cylinder 26 causes the rack 24 to move horizontally in either direction within the second compartment 17 so as to adjust the distance between the front and rear roller units 16a, 16b and 18a, 18b to the wheel base of a given vehicle V to be tested.

Each of the roller units 16a, 16b and 18a and 18b comprises a drive roller 27 and an idler roller 28 both of which are vertically movable into and out of peripheral engagement with the treads of the corresponding front tires 29a, 29b or rear tires 30a, 30b of the vehicle V. This vertical movement of the rollers 27 and 28 is effected by a lift 31 disposed between the drive rollers 27 and the idler rollers 28 and vertically movable toward or away from the vehicle tires by means of a second fluid-operated cylinder 32 to allow the vehicle V to set in testing position or to be removed from the apparatus 10.

Figure 3:
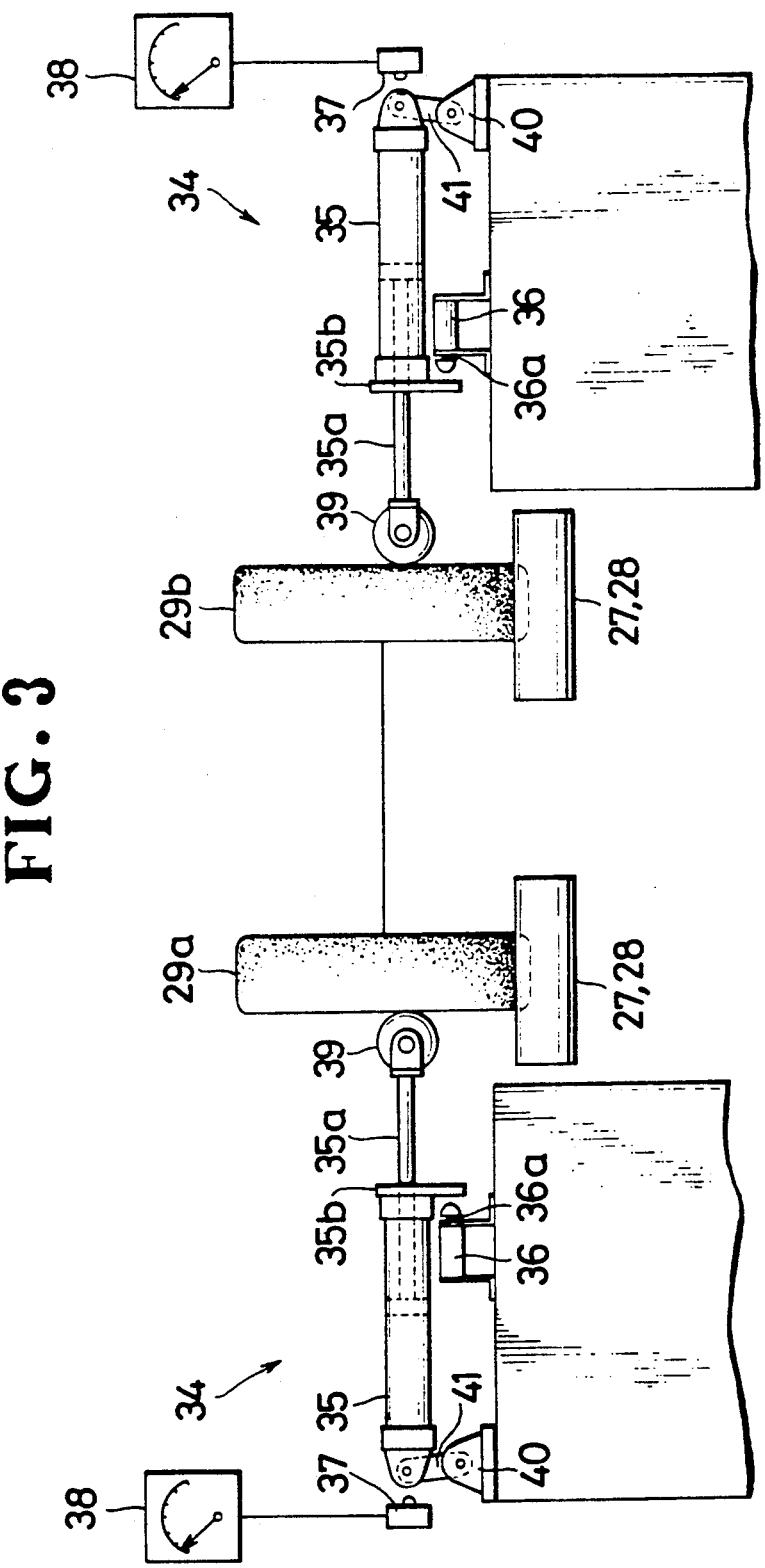
FIG. 3 schematically illustrates a displacement sensor unit incorporated in the apparatus of FIG. 1.
Figure 4:
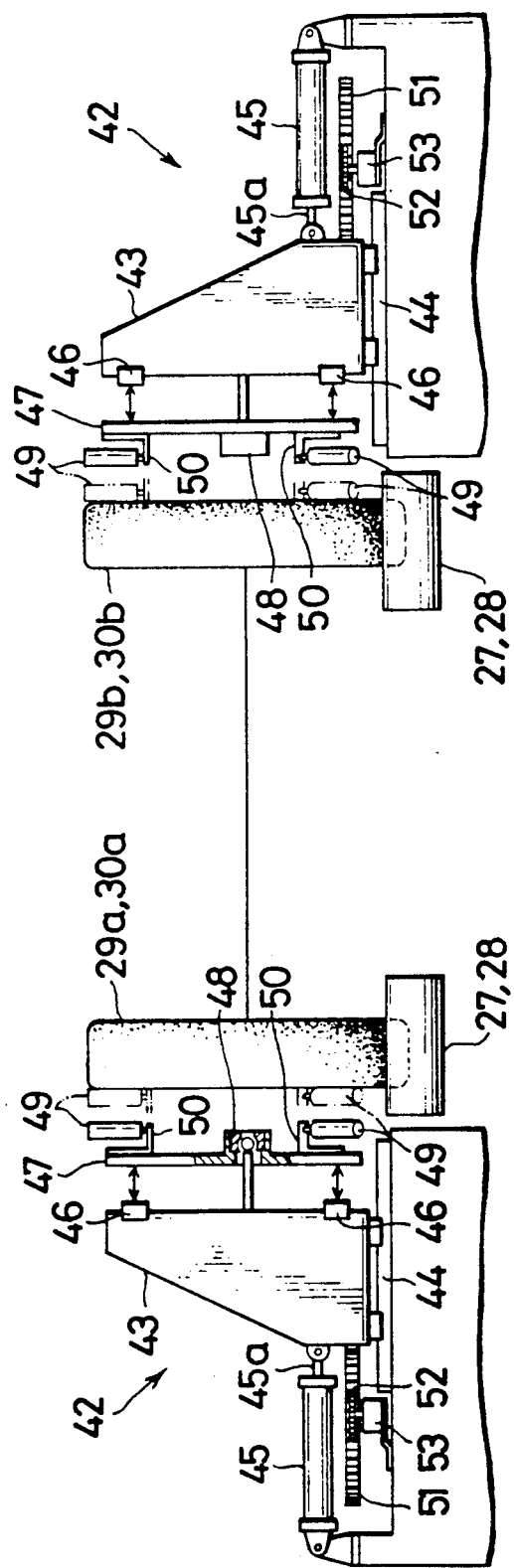
FIG. 4 schematically illustrates a toe-in or camber sensor unit incorporated in the apparatus of the invention.
Figure 5:
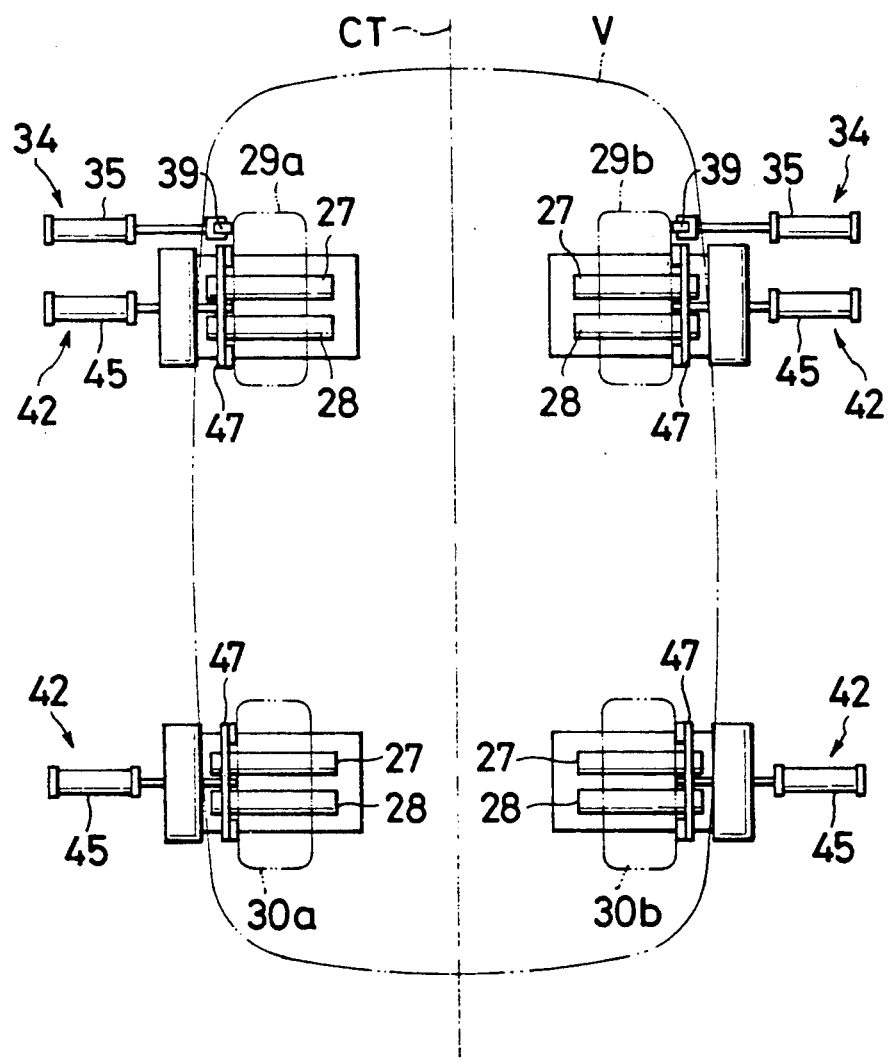
FIG. 5 is a schematic plan view of the apparatus utilized to explain the operations of the displacement and toe-in or camber sensor units.

The drive rollers 27 are driven by respective motors M via drive belts 33 and adapted in turn to drive the vehicle tires at any predetermined rate of speed under conditions simulating actual on-road performance. Referring now to FIG. 3 in particular, there is shown a first sensor unit or a wheel displacement sensor unit 34 provided in a position corresponding to the location of each of the front roller units 16a, 16b and generally comprising a third fluid-operated cylinder 35, a fourth fluid-operated cylinder 36, a load-cell 37, and a pressure meter 38. The third cylinder 35 is connected at one end with its piston rod 35a to a sensor roller 39 and at the opposite end to a support bracket 40 through a link 41 which is pivotally interconnected therebetween. The fourth cylinder 36 has its piston rod 36a engageable with a connecting bracket 35b of the third cylinder 35. A forward stroke of the piston rod 36a causes the third cylinder 35 to move toward the center line CL of the apparatus 10 until the sensor roller 39 comes into abutting engagement with the outer side wall of the front tire 29a (29b), whereupon the third cylinder 35 is locked, thereby restricting axial movement of the front tires 29a, 29b, followed by a backward stroke or retraction of the piston rod 36a of the fourth cylinder 36. When the front tires 29a and 29b are rotated, either of them tends to drift or swerve sideways and urges the third cylinder 35 backward through the pivotal movement of the link 41 so that the opposite end of the cylinder 35 remote from the sensor roller 39 is brought into pressure engagement with the load-cell 37, the pressure developed thereat being read by the pressure meter 38.

A second sensor unit or a toe-in sensor unit 42 provided in accordance with the invention is located above and in parallel with each of the roller units 16a, 16b and 18a, 18b for measuring the toe-in of the vehicle V, as shown in FIGS. 1, 2, 4 and 5. The second sensor unit 42 comprises, as better shown in FIG. 4, a sensor frame 43 which is movable horizontally slidably on and along a guide rail 44 secured to the upper frame member 12 of the machine frame 11, a fifth fluid-operated cylinder 45 having its piston rod 45a connected to the sensor frame 43, a pair of optical displacement sensors 46 attached at the upper and lower ends of the sensor frame 43, a tiltable or deflective disc 47 connected centrally through a universal joint 48 to the sensor frame 43 in confronting relation to the sensors 46 and a plurality (three in the illustrated embodiment) of rollers 49 rotatably supported on respective brackets 50 secured at predetermined or equally spaced intervals to the disc 47.

Actuation of the fifth cylinder 45 causes the rollers 49 to move into and out of engagement with the outer side wall of the tire 29a, (29b, 30a, 30b).

The amount of horizontal movement of the rollers 49 toward and away from each of the tires 29a, 29b, 30a, 30b is measured by a pinion and rack arrangement comprising a toothed rack 51 secured to the rear end of the sensor frame 43 and a pinion 52 rotatably engaged with the rack 51 and connected to a potentiometer 53 leading to a computer unit not shown.

The alignment measuring and adjusting apparatus 10 thus constructed operates in the following manner.

Figure 6A:
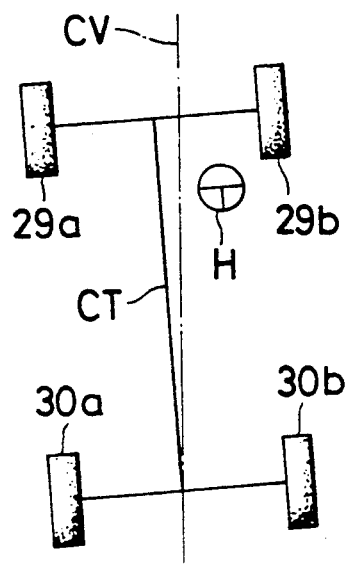
FIGS. 6A–6C inclusive are schematic diagrams utilized to explain the method of measuring and adjusting a vehicle wheel alignment according to the invention. Like reference numerals refer to like or corresponding parts throughout the several views.

The first cylinder 26 is actuated to bring the rear roller units 18a, 18b into position registering with the rear wheels of the vehicle V, so that all of the vehicle wheels are mounted in their respective proper positions corresponding to the front and rear roller units 16a, 16b, 18a, 18b. The second cylinder 32 in each roller unit is then actuated to raise the lift 31 until the rollers 27 and 28 are brought into abutting engagement with the thread of the corresponding tire, at which time the vehicle V is positioned out of alignment with the center line CT of the apparatus 10 as exemplified in FIG. 6A.

Figure 6B:
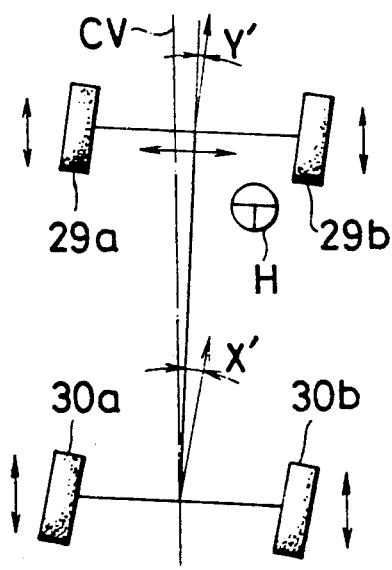

The motors M are then put into operation to drive the roller 27, 28 which in turn rotate all of the four wheels or tires 29a, 29b, 30a, 30b, during which time the front roller unit 16a and the rear roller units 18a, 18b are allowed to move slightly back and forth in parallel to the center line CT and help balance out the tire positions. The speed of the motors M is now increased so that the vehicle wheels run under actual on-road conditions as schematically shown in FIG. 6B which represents the tire positions prior to alignment adjustment. This is followed by the operation of the displacement sensor units 34 in which the fourth cylinder in each unit is actuated to move the third cylinder 35 toward the center line CT until the sensor roller 39 comes into abutting engagement with the front tire 29a (29b) as shown in FIG. 3, in which instance the third cylinder 35 is held freely movable. The pressures developed on contact of the sensor rollers 39, 39 of the two parallel units 34, 34 with the front tires 29a, 29b are transmitted through the respective load-cells 37, 37 and read by the respective meters 38, 38.

All of the four toe-in sensor units 42 now put into operation in which the fifth cylinder 45 in each unit is actuated to move the sensor frame 43 toward the center line CT until the rollers 49 are brought into abutting engagement with the corresponding tire 29a (29b, 30a, 30b). Rotating contact between the rollers 49 and the corresponding tires 29a-30b in each of the four sensor units 42 produces angular or deflective movement of the tiltable disc 47, which movement is captured through the medium of a light beam and sensed by the displacement sensor 46 leading to a computer unit. At the same time, the amount of horizontal movement of each of the sensor units 42 is measured by the potentiometer 53 leading to the computer unit.

Figure 6C:
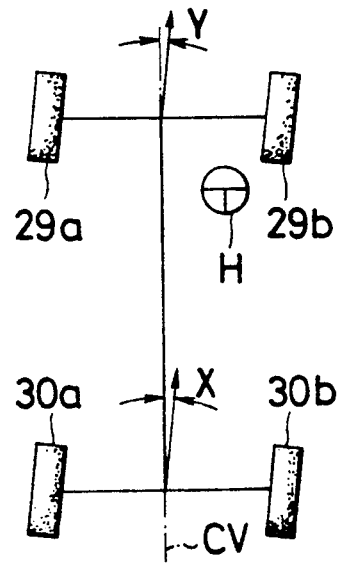

The operator is now ready to adjust the wheel alignment of the vehicle V in a manner well known in the art by first adjusting the total toe-in angle of the rear tires 30a, 30b to the specification setting with reference to the readings of the displacement sensors 46, thus registering the thrust angle X' (FIG. 6B) with the thrust angle X (FIG. 6C). This adjustment causes either one of the rear tires 30a, 30b to shift toward or away from the center line CT and corrects any displacement of the vehicle V with respect to the apparatus 10, thus bringing the center line CV of the former into alignment or parallel relation with the center line CT of the latter. This can be confirmed by the meters 38, 38 showing "O" reading, or conveniently by observing a lamp display indicating completion of the center-to-center alignment.

The steering wheel H is then set in straight run position as shown in FIG. 6C, followed by adjusting the total toe-in angle of the front tires 29a, 29b to the specification with reference to the readings of the displacement sensors 46, thus registering the center toe-in angle Y' (FIG. 6B) with the center toe-in angle Y (FIG. 6C).

In the illustrated embodiment, the front right roller unit 16b is held horizonatlly immovable while the roller units 16a, 18a, 18b are horizontally movable. This arrangement contributes to speedy alignment of the apparatus center line CT with the vehicle center line CV as the roller unit 16b serves as a reference point.

Obviously, various modifications and variations of the present invention are possible in the light of the above teaching. It is therefore to be understood that within the scope of the appended claims the invention may be practiced otherwise than as specifically described.

What is claimed is:

1. A method of measuring and adjusting the wheel alignment of a four-wheeled automotive vehicle wherein the toe-in-angle of each wheel must be checked and adjusted to manufacturer's specifications, which comprises the steps of:
   (a) rotating the front and rear tires of the vehicle on respective roller units which are held for free horizontal movement longitudinally of the vehicle;
   (b) bringing the outer side walls of both front tires into pressure contact with a first sensor unit and restricting axial movement of the front tires;
   (c) measuring the pressure developed on contact of the front tires with the first sensor unit;
   (d) measuring the toe-in-angle of each of the front and rear tires with a second sensor circuit;
   (e) adjusting the toe-in-angle of each of the rear tires to the manufacturer's specifications until the pressure measured in step (c) becomes zero; and
   (f) adjusting the toe-in-angle of each of the front tires.

2. An apparatus for measuring and adjusting the wheel alignment of an automotive vehicle wherein the toe-in-angle of each wheel must be checked and adjusted to the manufacturer's specifications, which comprises:
   (a) a roller unit disposed for free horizontal movement longitudinally of the vehicle and including rollers engageable with the tread of each of the front and rear tires;
   (b) means for driving said rollers to rotate with each of the front and rear tires;
   (c) a first sensor unit having first means for restricting axial movement of the front tires and second means for measuring the pressure developed on contact of said first means with the front tires, said first means being connected at one end to a pivotal link; and
   (d) a second sensor unit movable horizontally toward and away from the center line of the apparatus and having third means for detecting said toe-in-angle of each of the front and rear tires, said third means including an optical displacement sensor, a tiltable disc member disposed in confronting relation to said displacement sensor and a plurality of rollers supported on said tiltable disc member and engageable with the side wall of each of the front and rear tires, where said roller unit engageable with either one of the front tires is held immovable horizontally while the remaining front and rear tires are freely movable.

3. An apparatus for measuring and adjusting the wheel alignment of an automotive vehicle wherein the toe-in-angle wheel must be checked and adjusted to the manufacturer's specifications, which comprises:
   (a) a roller unit disposed for free horizontal movement longitudinally of the vehicle and including rollers engageable with the tread of each of the front and rear tires;
   (b) means for driving said rollers to rotate with each of the front and rear tires;
   (c) a first sensor unit having first means for restricting axial movement of the front tires and second means for measuring the pressure developed on contact of said first means with the front tires, said first means being connected at one end to a pivotal link; and
   (d) a second sensor unit movable horizontally toward and away from the center line of the apparatus and having third means for detecting said toe-in-angle of each of the front and rear tires, said third means including four optical displacement sensors, a tiltable disc member disposed lin confronting relation to said displacement sensor and a plurality of rollers supported on said tiltable disc member and engageable with the side wall of each of the front and rear tires, further including a lift adapted to move said roller unit rollers into and out of peripheral engagement with the treads of the tires.

4. An apparatus for measuring and adjusting the wheel alignment of an automotive vehicle wherein the toe-in-angle of each wheel must be checked and adjusted to the manufacturer's specifications, which comprises:
   (a) a roller unit disposed for free horizontal movement longitudinally of the vehicle and including rollers engageable with the tread of each of the front and rear tires;
   (b) means for driving said rollers to rotate with each of the front and rear tires;
   (c) a first sensor unit having first means for restricting axial movement of the front tires and second means for measuring the pressure developed on contact of said first means with the front tires, said first means being connected at one end to a pivotal link; and (d) a second sensor unit movable horizontally toward and away from the center line of the apparatus and having third means for detecting said toe-in-angle of each of the front and rear tires, said third means including four optical displacement sensors, a tiltable disc member disposed in confronting relation to said displacement sensors and a plurality of rollers supported on said tiltable disc member and engageable with the side wall of each of the front and rear tires, wherein said roller unit engageable with either one of the front tires is held immovable horizontally while the remaining front and rear tires are freely movable, further including fourth means for measuring the amount of horizontal movement of said second sensor unit, said fourth means comprising a pinion and rack arrangement and a potentiometer connected thereto, and further including a lift adapted to move said roller unit rollers into and out of peripheral engagement with the treads of the tires.

* * * * *